Aug. 3, 1965  G. A. MITCHELL  3,198,102
PHOTOGRAPHIC CAMERA WITH AN ADJUSTABLE SEMI-REFLECTOR
FOR PHOTOGRAPHIC FILM EXPOSURE
Filed March 23, 1962
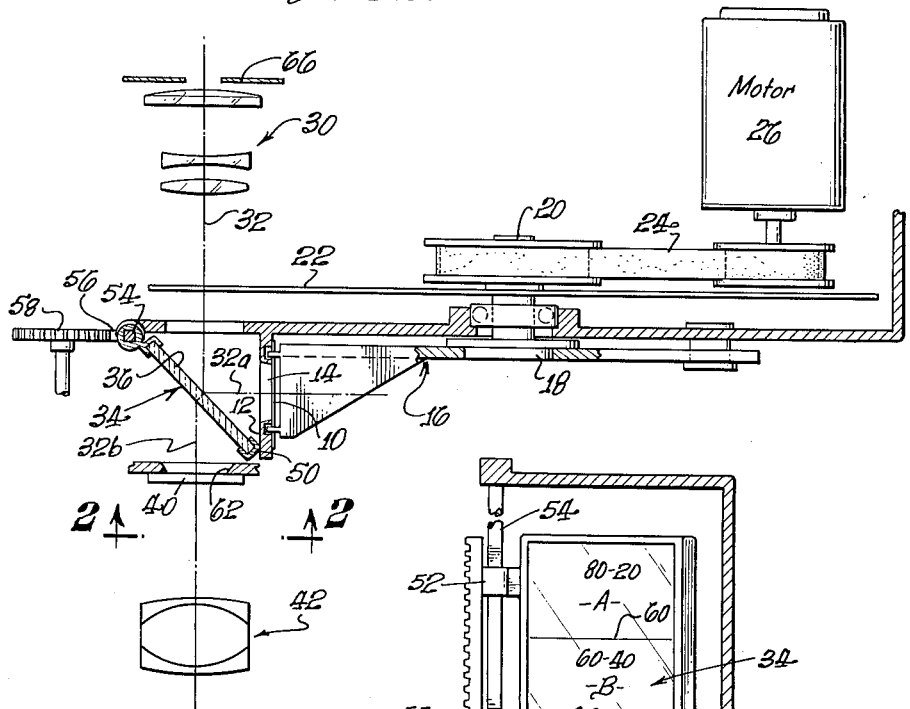
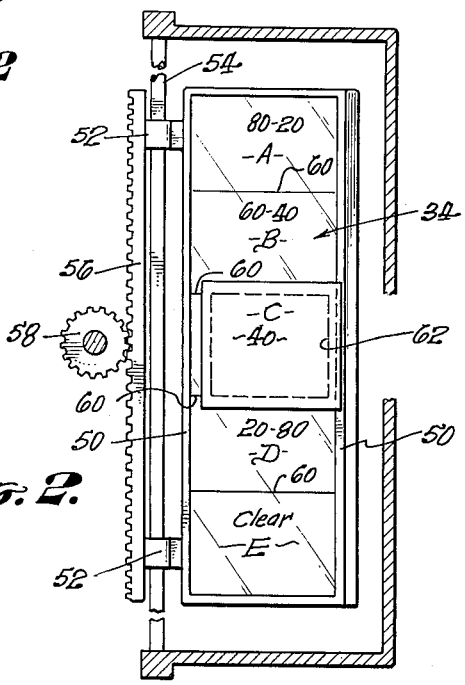
GEORGE A. MITCHELL,
INVENTOR.
BY
Buckle & Lewis

3,198,102
PHOTOGRAPHIC CAMERA WITH AN ADJUSTABLE SEMI-REFLECTOR FOR PHOTOGRAPHIC FILM EXPOSURE

George A. Mitchell, 687 Prospect Crescent, Pasadena, Calif.
Filed Mar. 23, 1962, Ser. No. 181,882
2 Claims. (Cl. 95—64)

The present invention relates generally to photographic cameras, as is here specifically and illustratively described in relation to motion picture cameras. The general characteristic of the invention resides in its provision, behind the objective lens, of an adjustable reflector carrying a plurality of stepped or graduated reflective areas, by which a selected portion, or all, of the light from the objective may be directed to the film or other actinic surface, with a remaining portion, or all, that light directed to a viewing surface for focussing or view finding. Under average photographing conditions the view finder takes only that portion of the light not necessary for standard or desired actinic exposure.

The invention will be best understood from the following descriptions of an illustrative embodiment shown in the accompanying drawings, in which:

FIG. 1 is a schematic plan showing a typical illustrative form of the invention; and FIG. 2 is a somewhat enlarged schematic view in the aspect of line 2—2 on FIG. 1.

In the accompanying schematic drawings illustrative of te invention, film 10 is shown on its usual film plane behind aperture plate 12 for exposure through aperture 14. The film movement is indicated at 16, driven by cam 18 which, in this particular embodiment, is shown carried directly on the shaft 20 of shutter 22. The particular arrangement here lends itself to such a direct association of the shutter and movement, requiring no gearing to synchronize them. Thus the drive may be by a timing belt 24 from a synchronous motor 26. Other general arrangements are spoken of below.

The photographic objective is indicated at 30, casting its image forming beam along the axis 32 onto a diagonally placed semi-reflector element or plate 34. At the face 36 of that reflector element a part of the image beam is reflected along axis 32a and forms its photographic image on the film at aperture 14. The part of the light beam not reflected along 32a passes through the semi-transparent reflector plate 34 and along axis 32b to form a duplicate image on the face of ground glass 40 where that image may be viewed through a magnifier 42. The optical distances of the film plane and the ground glass plane from the reflection face of reflector 34 are equal so that the image on 40 is a duplicate of that on the film—except merely for the relative right and left reversal of the image on the film.

Diagonal reflector element or plate 34 is vertically adjustably movable in its diagonal plane. For example, it is here shown mounted in a frame 50 mounted by lugs 52 to slide on a vertical shaft 54 whch may, for instance, be square in section to hold the reflector in its plane. A rack and pinion 56, 58 is typically shown for moving the reflector vertically.

On its front reflecting face 36 the reflector is divided into two or more areas such as here shown as A, B, C, D, E delineated by the horizontal lines shown at 60, each area being commensurate in size and of the same shape as the image frames on the film and on ground glass 40. The frame size is indicated at 62 in FIG. 2, and as the aperture 62 in FIG. 1.

The several reflective areas A, B, etc., are coated for different reflectivities. For example, area A may be either totally reflective or 80% reflective and 20% transmissive; area B 60% reflective, 40% transmissive; area C 40% reflective, 60% transmissive; area D 20% reflective, 80% transmissive; and area E clear for 100% transmission.

With any given setting of the objective iris, indicated at 66, reflector 34 may be set to reflect along axis 32a to the film, that amount of light necessary for standard or any desired film exposure. In any such setting only that portion of the light not required for film exposure is transmitted to the ground glass 40 for view finding. For focussing, the reflector may be shifted to its position transmitting all the light to the ground glass.

The several reflective areas A, B, etc. on reflector 34 may be used in full effect as the light stops for the film exposure. For example, the reflective fractions of those several areas may be made to correspond to the light passing stop settings of a standard iris. Thus, with the lens iris wide open at, say F.4.3, area A, totally reflective, will expose the film at F.4.3. Then, the fractional reflectivities of the several reflective areas B, C, etc., may be such as to expose the film to the light corresponding to the other standard F ratios, through, for instance, F16, F32, etc. The adjustable reflector 34 may thus serve as the objective lens stop.

The angle of the reflective plane of reflector 34, need not be at 45° from lens axis 32. And the relative positions of film 10 and ground glass 40 may be reversed. That is, film 10 may be in the position here shown for ground glass 40, to take the light transmitted by 34, with the ground glass in the position here shown for film 10 to take the reflected light. The film movement mechanism would then of course be synchronized with the shutter in the manner usual in cameras where the film and shutter planes are parallel. The arrangement here shown has the advantage, however, of direct articulation of the film movement with the shutter, and of the view finder axis being the same as the photographic objective axis. The magnifier at 42 may be of the erecting type so that the view of the image on the ground glass is the same as seen by the photographer looking in the direction in which the objective is oriented.

It will be readily understood that the invention is not necessarily limited to motion picture cameras. The film at 10, or in the position of ground glass 40, may be stationary to take a still picture, as, in fact, the motion picture film is for each picture frame.

I claim:

1. In a photographic camera, the combination consisting essentially of
    a photographic objective passing an image forming beam along an axis,
    a semi-reflector and semi-transmission element adjustably movable in a plane intersecting that axis behind the objective at an angle non-normal to that axis,
    said reflector and transmission element having a multiplicity of areas movable by adjustment of said element into position intersecting the image forming beam,
    said multiplicity of areas having respectively different reflective and transmissive ratios to reflect and transmit selected multiple different portions of the image forming beam along axes at an angle to each other, an actinic surface positioned to receive the image beam on one of said relatively angular axes, and an image viewing element positioned to receive the image beam on the other of said relatively angular axes, all whereby the total intensity of the image beam going to the actinic surface may be multitudinously variable to accommodate that intensity to the requirements of the actinic surface without varying the total intensity of the image forming beam passed by the objective, and whereby the image viewing element receives substantially all of the light from the objective beam not going to the actinic element.

2. The combination defined in claim 1, and in which the transmitted beam portion lies on an axis substantially parallel to the axis of the objective, and the viewing element is positioned on the axis of the transmitted beam portion.

References Cited by the Examiner

UNITED STATES PATENTS

| | | | |
|---|---|---|---|
| 2,089,703 | 8/37 | May. | |
| 2,120,654 | 6/38 | Spence et al. | 88—16 |
| 2,185,847 | 1/40 | Harrison et al. | 88—24 |
| 2,417,125 | 3/47 | Reeves | 88—1.5 |
| 2,698,356 | 12/54 | Roos. | |

FOREIGN PATENTS 942,130    4/56    Germany.

NORTON ANSHER, *Primary Examiner.*

EMIL G. ANDERSON, WILLIAM MISIEK,
*Examiners.*